(12) United States Patent
Segura et al.

(10) Patent No.: US 6,660,384 B1
(45) Date of Patent: Dec. 9, 2003

(54) COMPOUND TILE HAVING A NATURAL STONE VISIBLE FACE AND FABRICATION PROCESS

(75) Inventors: Juan J. Pastor Segura, Novelda (ES); Kepa Ceara Apraiz, Madrid (ES); Jose Maria Martinez Tejera, Madrid (ES)

(73) Assignee: Uralita de Productos Y Servicios, S.A., Madrid (ES)

( * ) Notice: Subject to any disclaimer, the term of this patent is extended or adjusted under 35 U.S.C. 154(b) by 69 days.

(21) Appl. No.: 09/850,735

(22) PCT Filed: Jul. 27, 2000

(86) PCT No.: PCT/ES00/00284
§ 371 (c)(1),
(2), (4) Date: Aug. 2, 2001

(87) PCT Pub. No.: WO01/07248
PCT Pub. Date: Feb. 1, 2001

(30) Foreign Application Priority Data

Jul. 28, 1999 (WO) .............................. PCT/ES99/00239
Apr. 27, 2000 (ES) ........................................ 200001078

(51) Int. Cl.[7] .............................................. B32B 27/38
(52) U.S. Cl. ...................... 428/413; 428/688; 428/703; 156/61; 156/263; 156/285; 156/330; 125/12
(58) Field of Search ................................ 428/413, 688, 428/703; 156/285, 330, 61, 263; 125/12

(56) References Cited

U.S. PATENT DOCUMENTS 4,911,138 A * 3/1990 Leis ........................ 125/16.01

FOREIGN PATENT DOCUMENTS

| EP | 0 053 092 | 6/1982 |
| EP | 0 252 434 | 1/1988 |
| FR | 0 450 924 | 10/1980 |

* cited by examiner

Primary Examiner—Robert Dawson
Assistant Examiner—Christopher M Keehan
(74) Attorney, Agent, or Firm—Nixon Peabody LLP; Jeffrey L. Costellia

(57) ABSTRACT

Compound tile with natural stone visible side, preferably marble, of the type comprising a plate of natural stone having a reduced thickness and firmly fixed by adhesive means to a rigidification supporting sheet, said support having a particular composition which is adapted to the physical characteristics of the natural stone plate.

33 Claims, 4 Drawing Sheets

COMPOUND TILE HAVING A NATURAL STONE VISIBLE FACE AND FABRICATION PROCESS

OBJECT OF THE INVENTION

The present invention consists of a compound tile with a natural stone visible face, preferably marble, of the type comprising a plate of natural stone of reduced thickness and firmly fixed by adhesive means to a rigidification and strengthening supporting sheet, said support having a particular composition which is adapted to the physical characteristics of the natural stone plate.

The present invention also consists of a process for manufacturing the above-mentioned tiles, in which the union between the natural stone plate and the supporting plate is made by stacking and curing the adhesive between plate and sheet in an oven.

The compound tile with natural stone visible face of the present invention has a special application in all sectors which commonly use natural stone, mainly for decoration.

DESCRIPTION OF THE STATE OF THE ART

In the state of the art the use of sheets of different materials is known, which are joined to plates of natural stone, for example marble, to obtain a lighter more rigid and cheaper compound tile by replacing part of the stone by other materials which prevent the mineral from breaking due to its fragility. But the industrial manufacturing process has not been technically developed or solved effectively. In order to obtain thin plates of natural stone, which involve a good use of the material and a lower cost, a combination of natural stone and supporting sheet are subjected to cutting processes.

In U.S. Pat. No. 3,723,233, filed by P. T. Bourke et al., a process is disclosed which consists of sticking a 2–5 mm sheet of natural stone, specifically marble, to a metal sheet, preferably having a honeycomb panel structure, and a thickness of between 1 and 2 cm. Since the metal material is light in weight but resistant to compression, it is strengthened with thin layers of fibreglass, which increase its resistance to tension and which are situated at both ends of the metal plate. For sticking the different components together, an epoxy resin or polyurethane resin is used. In this process, the use of material having a honeycomb panel structure does not offer the guarantees necessary for its later use as a support since it is difficult to attach it to floors and especially to walls. Moreover, the manufacture of honeycomb panel structures requires the use of especially light materials which increase the cost of the finished product, not only due to the material but also to the greater volume, which affects material transport costs. In the described process, the compatibility between the physical and chemical features of the minerals and the supporting materials is not analysed in relation to different physical effects which would influence the features of the final product, making its use and assembly complicated and unreliable.

Another method for obtaining strengthened tiles of natural stone may be seen in U.S. Pat. No. 3,950,202 filed by W. Hodges, in which a block of mineral material for decoration (marble, onyx, granite, etc.) is cut using a machine with parallel cutting blades, obtaining plates of approximately 20 mm in thickness. Once cut, supporting honeycomb panel sheets are stuck to the two larger sides of said plates and another cut is later made, this time through the middle of the previous mineral sheet, reaching a thickness of 5 mm, supported by an adhering honeycomb panel sheet. The use of other minerals is mentioned, and in the event that these are translucent, colouring is used on the supporting plate to camouflage this, thus unifying the appearance of the tile. In addition to the supporting materials mentioned, fibre wood, cellular structures of fibreglass and asbestos and even derivatives of Portland cement may be used. In this process, with the natural stone sheets in vertical position, that is, supported on their side of least thickness, the applicant is able to separate them after cutting without falling and then to introduce a strengthening sheet between each sheet, preferably also made of light material and with a honeycomb panel structure, which carries with it the drawbacks mentioned above. Adhesion of these supporting sheets to the natural stone sheets is carried out in this position, although it is not clear how application of the adhesive is carried out since if it is done in a vertical position an even application of said adhesive will not be obtained, which will affect the characteristics of the final product.

The feasibility of the manufacturing process and the strength of the compound tiles with a natural stone visible face stems mainly from the correct composition of the strengthening support material whose physical and chemical features must conform as far as possible to those of the natural stone so that they react in a similar way to the same physical or chemical reactions so that the compound tile is as stable as possible. Several materials may be used as a support for the natural stone plate, and different patent applications disclose the use of fibre materials, EP0252434, Leis, or polyurethane, EP255795, Rigas.

With respect to what has been described in the foregoing, an object of the present application is to obtain a supporting sheet for the natural stone plate with particular composition and materials which provide said sheet with similar characteristics to those of the natural stone plate so that their behaviour will be as similar as possible and the resulting stone product will have greater strength and said supporting sheet will have less thickness, particularly using fibre cement. To achieve this, it is necessary to prevent the distortions which occur in the fibre cement sheets mentioned in the state of the art when they absorb and release humidity, and which cause the natural stone plate to curve, becoming functionally unacceptable as a result and even breaking. To increase the stability of the resulting tile, it is necessary to increase the stability of the supporting sheet, which mainly consists of reducing the movement of humidification. The supporting sheets which use fibre cement described in the state of the art as a support for natural stone plates absorb humidity and release it, causing size increases. Because the fibre cement sheet is stuck to the natural stone plate, said size increases affect the tile resulting from said adhesion, making the tile curve and even break or crack.

Another object of the present invention is to provide improvements in the manufacturing processes used up to the present time for obtaining compound tiles with a natural stone visible face by means of introducing new materials and conditions into the industrial process.

DESCRIPTION

The objects mentioned above are, in accordance with the present invention, achieved by using a supporting sheet made up of a light sheet of reduced thickness to configure the tile with natural stone visible face, the purpose of said sheet being to strengthen the natural stone plate. The problem described above has been resolved in accordance with the invention by proposing and testing different materials and means to achieve on the one hand a reduction in the movement of humidification and on the other a reduction in resistance to the usual bending of fibre cement, pressed and cured in an autoclave, which has been chosen to make up said supporting sheet.

The movement of humidification is proportional, among other variables, to the cement content, to the inverse of the particle size and to the inverse of the density, variables which it has been necessary to modify by means of many test runs to achieve a greater stability of size. To increase stability and therefore reduce the movement of humidification it has been found that the cement content should be decreased, the sand content should be increased and the average size of the particles of the mixture should also be increased and, at the same time, the fibre percentage should be reduced in order to increase density. The products subjected to treatment in autoclave undergo an increase in their movement of humidification as they age. To prevent this, stabilising elements have been introduced into the composition, such as kaolin, alumina and mixtures thereof, which produce doping of the mould, retarding and reducing the effect of ageing. Another important factor in achieving size stability is to retard as far as possible the size changes caused by the movement of humidification, caused by the absorption of water into the fibre cement. To do this water repellents are included either in the paste or on the surface, or advantageously in both, which retard the penetration of water into the fibre cement or prevent it if it does not reach a sufficient pressure. These water repellents may be organic, inorganic or mixed.

The reduction of resistance to bending in the fibre cement is necessary since the movement of humidification never reduces completely and therefore the fibre cement sheet will always undergo small size changes. According to the force which the fibre cement exerts upon the natural stone, the latter will distort or not. Therefore, the distortion of the compound tile depends upon the resistance of the fibre cement: the greater the resistance the greater the distortion. The effects of a reduction in the resistance of fibre cement which is pressed and cured in an autoclave, mainly by reducing the percentage of cement and cellulose in accordance with the invention to values of 32–34% and 4–5% respectively, causes a significant increase in density and a reduction in bending resistance from values which are typical of fibre cement which is pressed and cured in an autoclave of 22 Mpa to values of 12 Mpa.

A fibre cement is known in the state of the art, with a low fibre content as described in patent application EP484283 filed by Tappa. In said patent application a manufacturing process for asbestos-free fibre cement is described which uses a completely different technology, air curing, giving rise to a type of fibre cement of lower quality and reliability, whose application as a supporting sheet is neither mentioned nor suggested, not being appropriate for this purpose, but only as a covering. Said fibre cement is made up of cellulose fibres, Portland cement, flocculant and strengthening fibres of polyvinyl alcohol. After mixing the different components, the compound is introduced in controlled temperature conditions but without subjecting it to chemical treatment or pre-treatment, nor, in contrast to the type of fibre cement used, to the pressing and curing operations in autoclave necessary for the objects of the present invention.

As a result of the foregoing changes in accordance with the principles of this invention, a fibre cement sheet is obtained which fails to comply with the typical characteristics of the same for covering facades, and as such, when laid out in the form of a sheet is extremely weak and fragile, the decrease in cement and fibre being as great as possible, provided that it allows handling and cutting operations to be carried out, but when adhering to a natural stone plate it increases the strength of the latter, allowing thicknesses which are impossible to use without the sheet described above and with a minimum of distortion due to humidity or temperature.

The supporting sheet is made up of a light sheet of reduced thickness, comprising a mixture of cement (20–35%), silica (40–50%), sand (5–10%) and cellulose fibre (4–8%), similar to fibre cement but with mechanical and chemical features which are different from the standard ones of fibre cement, obtained by pressing and autoclave curing. As described above, in order to reduce the movement of humidification, sand and stabilising and water-repelling agents are added to the paste or to the surface of the exposed faces of the tile. The cement and fibre content is very low in comparison with the standard amounts of fibre cement which is pressed and cured in an autoclave, but high enough to allow cutting and handling operations of the light sheet so that it may be stuck to the natural stone plate as described below. The reduction in cement and fibre content provides a high density in relation to other fibre cements and, as described above, a reduction in bending resistance and a reduction in the movement of humidification. Another additive which may be added to the supporting sheet mixture is a pigment which is, for example, stable in light, with the possible purpose of differentiating some compound tiles from others so that they will withstand conditions out of doors.

As mentioned above, the compound tile consists of a supporting sheet and a natural stone plate, which adhere together by means of an epoxy resin with two components, which incorporates a percentage of micro-granules or micro-nodules with a determinate diameter.

The supporting sheet of the natural stone plate is used to manufacture compound tiles in a manufacturing process made up of different stages:

from a block of natural stone, plates are cut with a thickness of more than twice that of the final thickness of the natural stone plate of the tile to be obtained;

a firm union by means of adhesive and compression of a supporting sheet to each face of said plate cut in the previous stage, forming a module with a natural stone plate sandwiched between two layers of fibre cement and subsequent curing of the adhesive;

cutting of said natural stone plates of said module into two, through the middle plane, to obtain two compound tiles, maintaining said module held and subjected to compression of the supporting sheets against the intermediate plate of natural stone; and shaving and polishing of the resulting natural stone visible face.

In order to carry out the process described above, the sheets of pressed and cured fibre cement are arranged in large sheets. From said sheets the sheets are obtained which will serve as a support for the natural stone plate by means of cutting according to the size of the natural stone plate. Said fibre cement sheets are to be dry and clean since in order to stick the natural stone to the supporting sheet, the faces which are to be stuck must, at the time they are joined, be clean, dry (by means of an appropriate prior process) and at a determinate temperature so that the application of glue as well as the subsequent sticking and permanent adhesion are optimal. An epoxy adhesive with two components is used for this operation. The supporting sheets or fibre cement stick to each one of the two faces of the natural stone plate, thus forming modules of fibre cement-natural stone-fibre cement.

For adhesion to be perfect, there must be a permanent gap or space between the two faces, as during the adhesive curing process several modules of fibre cement-natural stone-fibre cement are stacked and a certain pressure is exerted upon the same. In the event that this gap or space were not present, a large part of the adhesive would be expelled due to the pressure exerted by some modules upon others and due to the pressure exerted by additional means upon the whole stack. Said space is ensured by means of a fibreglass or cellulose mesh soaked in the adhesive and arranged between the supporting sheet and the natural stone plate or by means of micro-granules or micro-nodules incorporated by dispersion in the adhesive.

When the supporting sheet is superimposed on the natural stone plate, a relative movement occurs between both plates, enhanced by the presence of uncured adhesive. To prevent this movement holding means are provided between both plates.

As mentioned above, when pressure is applied on the stack of modules, the surplus adhesive used is expelled and may slide down the stack of modules, sticking not only the components of the same module, but also sticking components of different modules to each other, it being impossible or very difficult to separate them subsequently, or requiring machine work such as milling or sanding. To prevent this problem, the lower supporting sheet of each one of the modules has a larger surface size than the other sheet of fibre cement and larger than the natural stone plate, and is provided with additional shapes at its periphery which serve to retain the surplus resin when said pressure is applied to the stack of modules. Said additional shapes consist of peripheral channels and/or an adhering perimetric strip which prevent the surplus resin which is expelled when the modules are compressed from sliding down the stack of modules and causing the problem described above.

After stacking the modules and exerting permanent vertical pressure upon the stack, for example by means of bracing means which relate the upper sheet of fibre cement of the module situated at the highest position in the stack with the lower sheet of fibre cement of the module situated at the lowest position of the stack, the modules are introduced into an oven for curing the adhesive between the natural stone plates and the sheets of fibre cement at a determinate temperature and for a determinate time.

After curing the adhesive, the manufacturing process continues by cutting the natural stone plates of a module into two through a middle plane, thus obtaining two compound tiles, after which the visible face of each tile is shaved and polished.

DESCRIPTION OF THE DRAWINGS

To assist understanding of this invention which concerns a compound tile with a natural stone visible face and a manufacturing process, 7 drawings are attached to the present patent application, whose purpose is to promote a better understanding of the principles on which the present invention is based and a more complete understanding of the description of a preferred embodiment, taking into account that the nature of the drawings is illustrative and non-restrictive.

DESCRIPTION OF A PREFERRED EMBODIMENT

Figure 1:
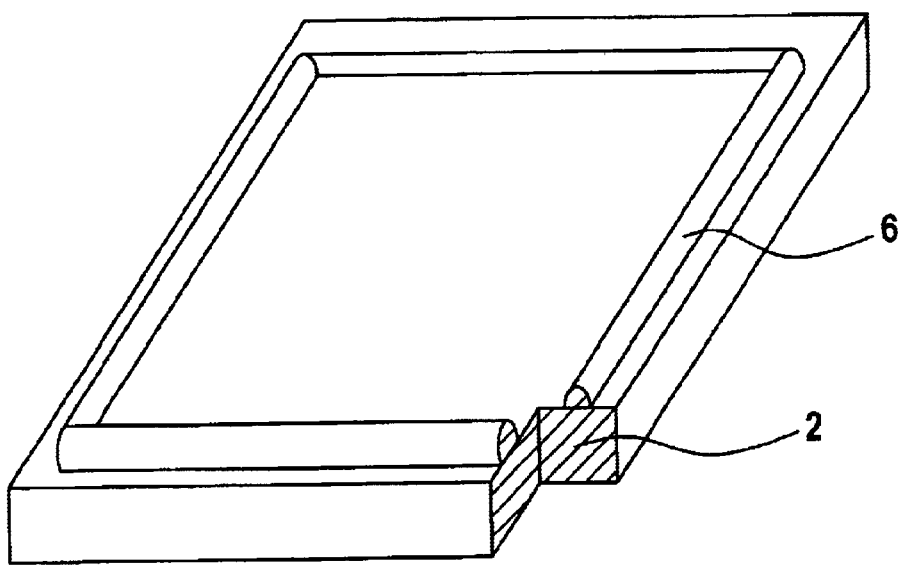
FIG. 1 shows a lower sheet of fibre cement with a section in which the strip retaining the adhesive may be observed.
Figure 2:
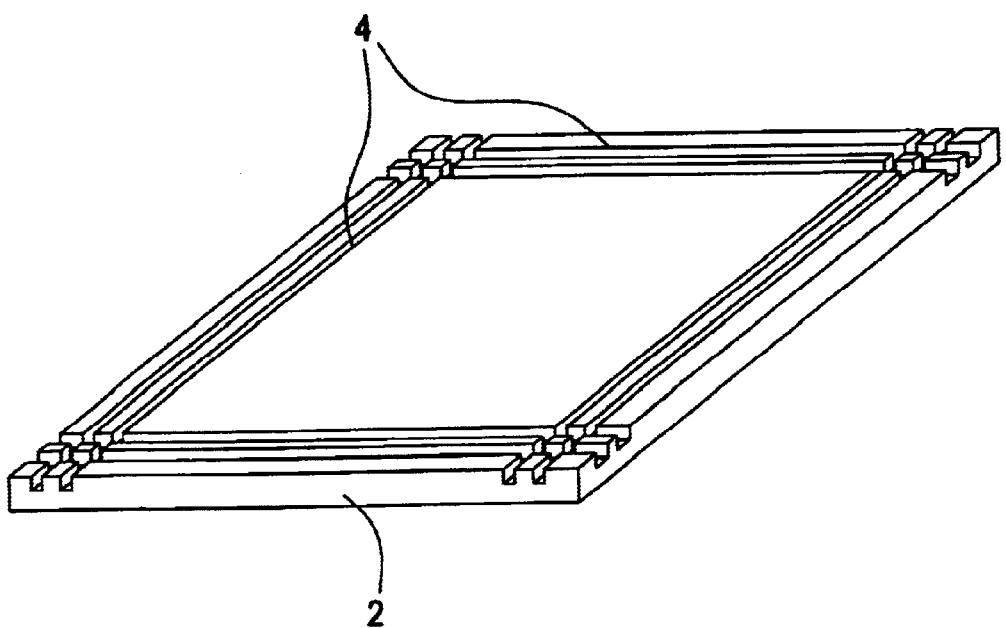
FIG. 2 shows a lower sheet of fibre cement with channels for retaining adhesive.
Figure 3:
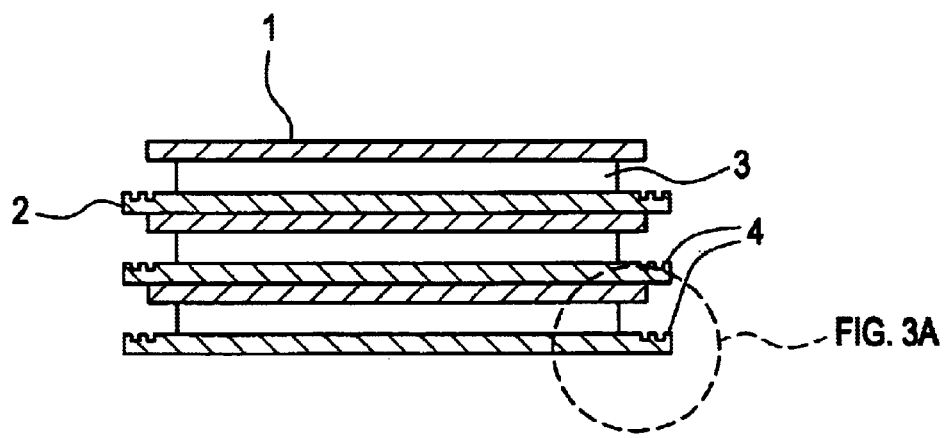
FIG. 3 shows a stack of modules, fibre cement-marble-fibre cement, in which one may observe a detail of the lower sheet of fibre cement with retention channels.
Figure 3A:
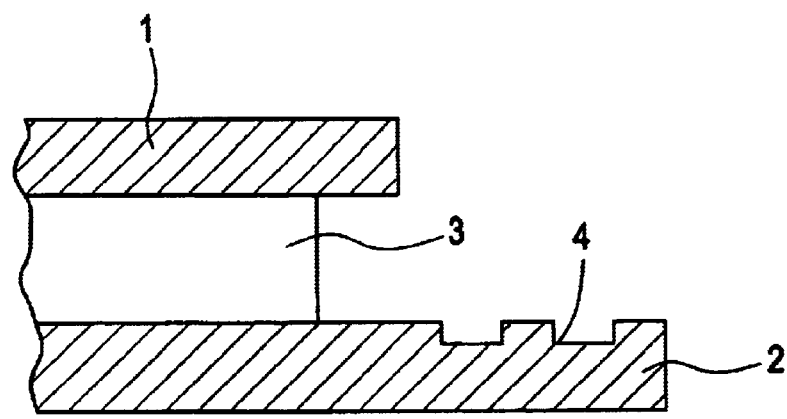
Figure 4A:
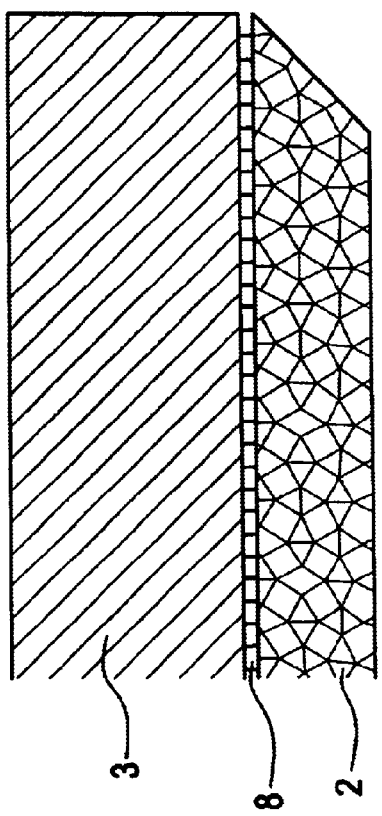
FIG. 4 shows a detail of a finished compound tile.
Figure 4:
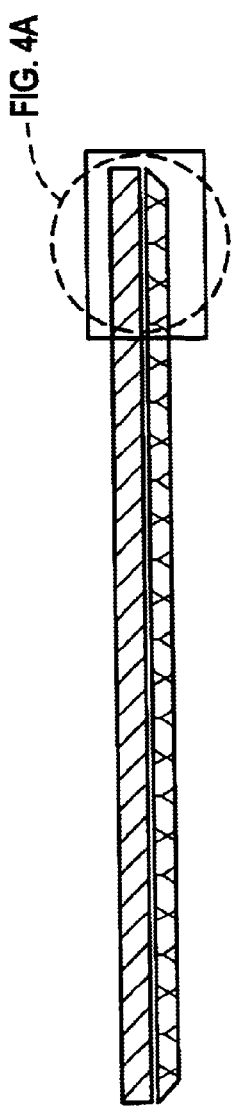
Figure 5:
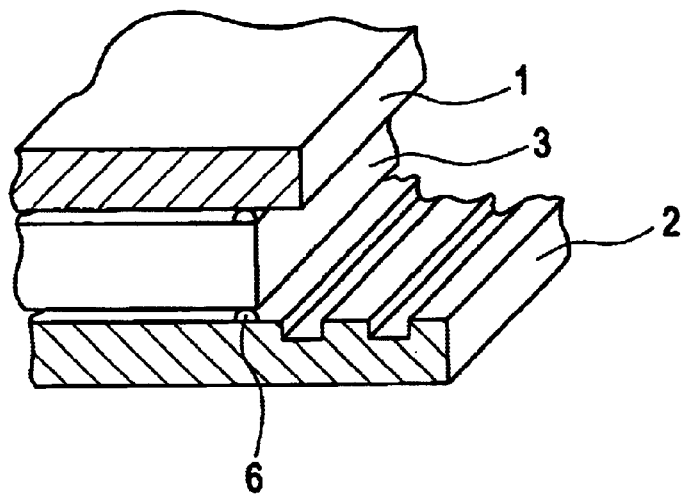
FIG. 5 shows a detail of the glue contact points for placing the sheets of fibre cement upon and under the marble, thus preventing their relative movement.
Figure 6:
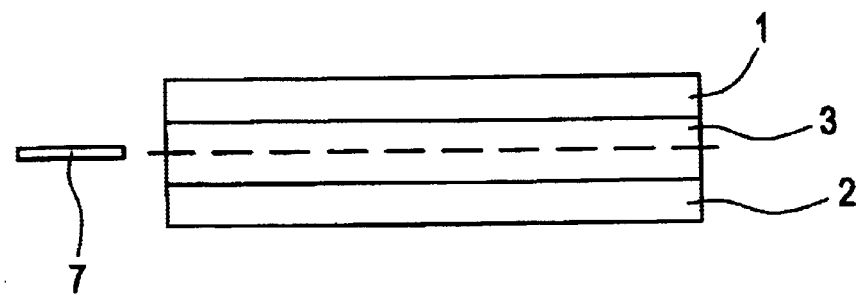
FIGS. 6 and 7 show two consecutive operations of the cutting process of a module of fibre cement-marble-fibre cement into two tiles with a visible marble face.
Figure 7:
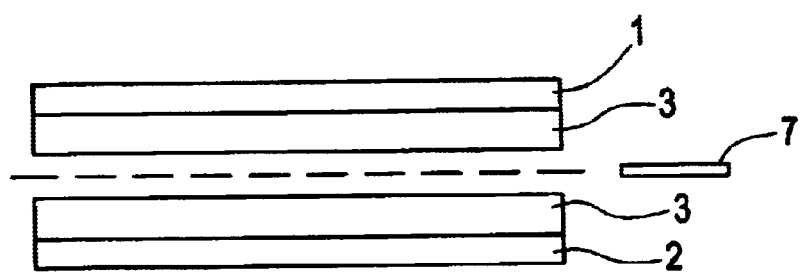

The present invention will be better understood from the following detailed description showing the main characteristics of the compound tile with a visible natural stone face 3 and its manufacturing process.

The compound tile is made up of a natural stone plate 3, preferably marble, and a supporting sheet 1,2, a fibre cement compound whose composition is as follows:

- silica, between 40 and 50% by weight with respect to the total composition,
- cement, between 32 and 34% by weight with respect to the total composition,
- sand, between 4 and 6% in weight with respect to the total composition, with a grain size of 0.1 mm.
- cellulose fibre, less than 6% by weight and preferably between 4 and 5% by weight with respect to the total composition.
- size stabilising agents, between 2 and 8% by weight with respect to the total composition, said agents being preferably alumina, kaolin and mixtures thereof.
- water-repellents, between 1 and 3% by weight with respect to the total composition, belonging to the siliconate group, preferably potassium methyl siliconate at a 15% concentration dissolved in water and applied to the surface with a ratio of 0.3 and 0.4 $l/m^2$.

Using these percentages, size stability of the fibre cement sheet 1,2 can be increased as the movement of humidification is reduced from 0.45% to 0.30% after an accelerated ageing process.

Another component which may be added to the mixture is a pigment of synthetic iron oxide which is useful in that it enables one tile to be distinguished from another, for example when a different pigment is used for each colour of the marble 3 or for protection against the elements.

For adhesion between the two materials, the marble plate 3 and the fibre cement sheet 1,2, the compound tile uses an adhesive, preferably epoxy resin with two components 8 which has micro-granules or micro-nodules in its composition with a mean diameter of 0.1 mm. The purpose of said micro-granules is to ensure a space between the marble plate 3 and the supporting sheet in order to ensure a minimum adhesive layer, as this is necessary due to the processes explained below.

The manufacturing process of the compound tiles with marble visible face 3 is carried out in the following stages:
- from a block of marble, plates are cut with a thickness of more than twice that of the final thickness of the marble plate 3 of the tile to be obtained;
- a firm union by means of adhesive and compression of a supporting sheet 1,2 to each face of said plate cut in the previous stage, forming a module with a marble plate 3 sandwiched between two layers of fibre cement 1,2 and subsequent curing of the adhesive 8;

cutting 7 of said marble plates of said module into two, through a middle plane parallel to the strengthening sheets, to obtain two compound tiles, maintaining said module held and subjected to compression of the supporting sheets 1,2 against the intermediate plate of marble 3; and shaving and polishing of the resulting marble visible face 3.

The following description will focus on the process of sticking the marble plates 3 to the fibre cement. To do this, before adhesion the fibre cement sheets 1,2 must be clean, that is free from dust, dry (by means of an appropriate conventional prior process) and at a temperature between 20 and 40° C. to achieve optimal adhesion. After this treatment, the components are stacked to form modules. Each module is made up of a supporting lower sheet 2 with a larger surface size than the following ones, the marble plate 3 on the lower sheet 2 and a supporting upper sheet 1 on the marble plate 3, forming modules of fibre cement-marble-fibre cement. These materials are stuck together, as mentioned above, by means of an epoxy resin with two components 8, but when a plate of material is superimposed upon another, due to the presence of this adhesive 8 a relative movement between the two materials occurs, for which reason strips of fast contact glue 6 are used as auxiliary elements to ensure the position and subsequently the resin 8 undergoes curing. The adhesive 8 is provided with micro-granules so that during subsequent stacking it is not completely expelled by the effect of the pressure exerted; due to the micro-granules a sufficient amount of the adhesive 8 remains inside for sticking evenly.

The lower fibre cement sheet 2 of each module, having a greater surface area than the others, has means 4, 6 to retain the resin 8 in each module, preventing said resin from making contact with the other modules. Said retention means consist of peripheral channels 4 with a depth of 1 to 1.2 mm or a peripheral strip 6 with a height of 3 mm, preferably made of wax.

Once the adhesive 8 is applied, between fifteen and thirty modules of fibre cement-marble-fibre cement are stacked and vertical pressure is applied which is maintained by means of, for example, braces which relate the lower fibre cement sheet 2 of the module situated at the base of the stack of modules with the upper fibre cement sheet 1 of the module situated uppermost in the stack.

When the foregoing pressure, variable between 1000 N/m² and 2000 N/m², is applied (if it were greater the marble plate 3 would break), the resin 8 between a marble plate 3 and the fibre cement sheet spills out, and is trapped by the channels 4 or by the strip 6. If these retention means did not exist, the resin 8 would descend the sides of the modules sticking different modules to each other.

After stacking, the stacks of modules are introduced into an oven with controlled humidity for curing the adhesive at a temperature ranging between 50 and 60° C. for approximately 1 to 2 hours.

In this way the module of fibre cement-marble-fibre cement is obtained and treated in one of the conventional machines in the natural stone industry, called a splitter, which by means of diamond discs separates this piece into two halves. In this way two compound marble tiles are obtained which are strongly stuck to a fibre cement sheet 1,2.

The final product of this process is a square or rectangular tile whose usual formats are:

30×30 cm
30.5×30.5 cm (12"×12")
33×33 cm
40×40 cm
40.6×40.6 cm
45.7×45.7 cm
30×60 cm
30.5×61 cm (12"×24")
33×66 cm
50×50 cm
60×60 cm
61×61 cm (24"×24")

The thicknesses based on the resulting plates of natural stone with a thickness of 7 mm, will be the result of adding the applied fibre cement sheet, according to the following variants:

| Natural Stone | Fibre cement | Total |
|---|---|---|
| 7 mm + | 2 mm = | 9 mm |
| 7 mm + | 2.5 mm = | 9.5 mm |
| 7 mm + | 3 mm = | 10 mm |
| 7 mm + | 3.5 mm = | 10.5 mm |
| 7 mm + | 4 mm = | 11 mm |
| 7 mm + | 4.5 mm = | 11.5 mm |
| 7 mm + | 5 mm = | 12 mm |

After the processes of smoothing, calibration and polishing of the resulting tiles, the natural stone plate has a thickness of 6 mm, with a perfectly polished surface and a slight bevel on its four edges. The rest of the thickness corresponds to the adhesive and the supporting fibre cement sheet.

The following objects are thus basically achieved:

1) natural stone tiles which are very strong, manageable, more easy to position and reliable.
2) better use of the processed natural stone.
3) application of marble slabs with a thickness of 2 cm for these purposes.

What is claimed is:

1. A compound tile comprising a natural stone plate; an adhesive; and a supporting sheet fixed to the natural stone plate by the adhesive, wherein
   the supporting sheet is produced by a process comprising pressing and autoclave curing a mixture containing cement; silica; cellulose fibers; sand; size stabilizing agents; and water-repelling agents.

2. The compound tile as claimed in claim 1, wherein the mixture comprises, in weight %,
   20–35% cement;
   40–50% silica;
   4–8% cellulose fibers;
   4–10% sand; and
   a remainder of the size stabilizing agents and the water-repelling agents.

3. The compound tile as claimed in claim 2, wherein
   the mixture contains between 4–6% by weight sand; and
   the sand has a mean grain size of approximately 0.1 mm.

4. The compound tile as claimed in claim 2, wherein mixture comprises between 32 and 34% by weight cement.

5. The compound tile as claimed in claim 2, wherein the mixture comprises less than 6% by weight cellulose fibers.

6. The compound tile as claimed in claim 5, wherein the mixture comprises 4–5% by weight cellulose fibers.

7. The compound tile as claimed in claim 2, wherein the size stabilizing agents are selected from the group consisting of alumina, kaolin and mixtures thereof.

8. The compound tile as claimed in claim 7, wherein the mixture comprises between 2 and 8% by weight of the size stabilizing agents.

9. The compound tile as claimed in claim 2, wherein the water-repelling agents are selected from the group consisting of organic and inorganic water-repellents and their mixtures.

10. The compound tile as claimed in claim 9, wherein the water-repelling agents are selected from the group consisting of sodium silicate, potassium silicate, calcium stearate and their mixtures.

11. The compound tile as claimed in claim 10, wherein the mixture comprises between 1 and 3% by weight of the water-repelling agents.

12. The compound tile as claimed in claim 2, wherein the tile further comprises water-repelling agents, said water-repelling agents comprising siliconates, on an exposed surface of the supporting sheet opposite the natural stone plate.

13. The compound tile as claimed in claim 12, wherein the water-repelling agents on the exposed surface comprise potassium methyl siliconate.

14. The compound tile as claimed in claim 1, wherein the movement of humidification of the supporting sheet after undergoing an accelerated aging process is approximately 0.30%.

15. The compound tile as claimed in claim 2, wherein the mixture further contains a pigment.

16. The compound tile as claimed in claim 15, wherein the pigment comprises a synthetic iron oxide.

17. The compound tile as claimed in claim 2, wherein the adhesive comprises a synthetic adhesive including micro-granules or micro-nodules.

18. The compound tile as claimed in claim 17, wherein the adhesive comprises an epoxy resin with two components.

19. The compound tile as claimed in claim 1, wherein the natural stone plate comprise marble.

20. A process for manufacturing a compound tile, the process comprising
cutting from a block of natural stone a first natural stone plate;
forming a module comprising two supporting sheets and the first natural stone plate sandwiched between the two supporting sheets;
fixing the two supporting sheets to the first natural stone plate with an adhesive, where the fixing comprises compressing the module and curing the adhesive;
cutting the first natural stone plate in two, through a middle plane, to obtain a second natural stone plate having a cut visible face;
shaving and polishing the cut visible face of the second natural stone plate; and
forming the compound tile, wherein
the compound tile comprises the second natural stone plate, the adhesive, and one of the two supporting sheets fixed to the second natural stone plate by the adhesive; and
each of the two supporting sheets is produced by a process comprising pressing and autoclave curing a mixture containing cement, silica, cellulose fibers, sand, size stabilizing agents, and water-repelling agents.

21. The process as claimed in claim 20, wherein the fixing comprises cleaning, drying, and maintaining at a temperature between 20 and 40° C. the first natural stone plate and the two supporting sheets.

22. The process as claimed in claim 20, wherein
the adhesive comprises an epoxy resin with two components; and
the adhesive further comprises means which provide a gap of 0.1–0.3 mm between the first natural stone plate and each of the two supporting sheets to ensure an even distribution of the adhesive.

23. The process as claimed in claim 22, wherein the means comprises a fiberglass or cellulose mesh.

24. The process as claimed in claim 22, wherein the means comprises micro-granules or micro-nodules with an average diameter of 0.10 mm.

25. The process as claimed in claim 20, wherein the curing comprises heating the adhesive.

26. The process as claimed in claim 20, wherein
the compressing comprises stacking the module with other such modules to form a stack of modules;
the module and the other such modules each comprises a lower supporting sheet and an upper supporting sheet;
the lower supporting sheet has a larger surface area than the upper supporting sheet; and
the lower supporting sheet comprises means for retaining surplus adhesive next to a periphery of the lower support sheet.

27. The process as claimed in claim 26, wherein the stack of modules is provided with means for holding the modules and the other such modules to prevent relative movement between them.

28. The process as claimed in claim 27, wherein the means for holding comprises strips of contact glue on each supporting sheet of the module.

29. The process as claimed in claim 26, wherein the means for retaining surplus adhesive comprises at least one selected from the group consisting of a peripheral channel and an adhering perimetric strip.

30. The process as claimed in claim 29, wherein
the peripheral channel has a depth of 1–1.2 mm; and
the perimetric strip has a height of 3 mm or less.

31. The process as claimed in claim 25, wherein the curing of the adhesive is carried out within a range of temperatures from 50 to 60° C.

32. The process as claimed in claim 26, wherein, after the stacking, vertical pressure is exerted upon the stack of modules.

33. The process as claimed in claim 32, wherein the vertical pressure is exerted by means of braces which relate an uppermost supporting sheet of the stack of modules with a lowermost supporting sheet of the stack of modules, and the braces are subject to traction.

* * * * *